Aug. 3, 1965     D. F. COLLINS     3,198,560

BRAZED TUBE COUPLING

Original Filed June 24, 1959

INVENTOR.
DONALD F. COLLINS
BY
John N. Wolfram
ATTORNEY

United States Patent Office 3,198,560
Patented Aug. 3, 1965

3,198,560
BRAZED TUBE COUPLING
Donald F. Collins, Bellevue, Wash., assignor to Parker-Hannifin Corporation, Cleveland, Ohio, a corporation of Ohio
Continuation of application Ser. No. 822,497, June 24, 1959. This application Mar. 6, 1963, Ser. No. 264,475
2 Claims. (Cl. 285—236)

This application is a continuation of application Serial No. 822,497, filed June 24, 1959, now abandoned.

This invention relates to couplings for tubes and more particularly to couplings to be joined to tubes by welding or brazing.

It is an object of the present invention to provide a coupling having a socket for receiving the tube and having a recess in the socket for receiving a split ring of braze metal, the split ring being initially of smaller inside diameter than the outside diameter of the tube whereby the ring will grip the tube when the latter is inserted therein and hold the tube in position preparatory to heating the coupling to accomplish the brazing.

It is another object to provide a coupling of the type described in which the brazing ring is chamfered on its inner corners to facilitate entry of a tube therein.

It is another object to provide a coupling of the type described in which the socket for receiving the tube has a tapered portion near the bottom thereof the largest diameter of said tapered portion being larger than the tube outside diameter and the smaller diameter of the tapered portion being smaller than the tube outside diameter whereby the tube end may lightly seat in said tapered portion prior to brazing for aiding in centering the tube, for holding the tube and fitting in proper position for brazing, for closing the clearance space between the tube and socket for preventing braze metal from entering the bore of the fitting, and for permitting the free end of the tube to wedge itself further into the socket as the tube end expands in length under temperature increases after brazing. In connection with the latter, the taper permits a slight breathing action of the tube end under temperature variations and thus avoids excessive strains upon the brazed connection which might otherwise crack the same.

Figure 1:
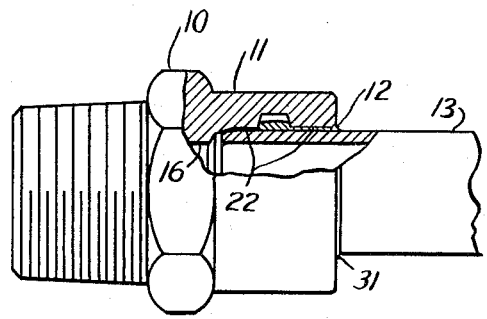
Figure 2:
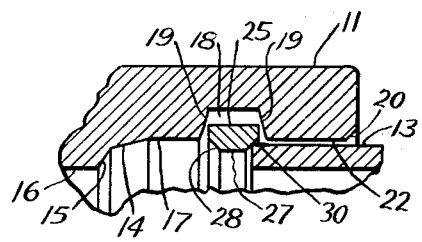
Figure 3:
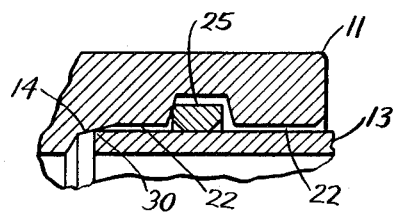
Figure 4:
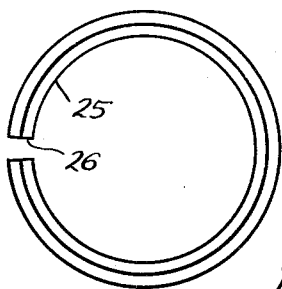

Other objects will be apparent from the following description and from the drawings in which:

FIG. 1 is a longitudinal cross section view of the coupling after brazing of the tube thereto, FIG. 2 is a fragmentary section view showing a tube partially entered in the coupling socket, FIG. 3 is a fragmentary section view showing a tube fully entered in the coupling socket and before heat has been applied for accomplishing the brazing, and FIG. 4 is an end view of the brazing ring.

The coupling comprises a body member 10 which has a boss 11 with a socket, generally designated 12, formed therein for receiving a tube 13. The socket includes a cylindrical bore 17 leading to a tapered portion 14. The taper of the portion 14 is preferably about 5 degrees. Adjacent this portion is a 45 degree chamfer 15 which intersects the bore 16 through the coupling.

Intermediate the ends of the cylindrical portion of the socket is an annular recess 18 having slightly tapered side walls 19. The taper of the side walls is preferably about 5 degrees. The outer end of the cylindrical bore 17 is chamfered 45 degrees as at 20.

The cylindrical bore 13 is a few thousandths of an inch larger in diameter than the outside diameter of the tube 13 so as to form a slight clearance 22 therebetween for receiving braze or weld metal.

The largest diameter of the tapered portion 14 corresponds to the diameter of the cylindrical bore 17 and is thus slightly larger than the outside diameter of the tube 13. The smallest diameter of the tapered portion 14 is a few thousandths of an inch smaller than the outside diameter of the tube 13 so that the outer corner of the end tube will contact the taper 14 and will be lightly wedged therein when the tube is completely inserted into the socket.

Located within the annular recess 18 is a split ring 25 of suitable braze or weld metal, the split being shown at 26 in FIG. 4. As shown in FIG. 2, the braze ring is initially assembled into the recess 18, preferably at the factory before shipment, and when in position within such recess its inside diameter 27 is smaller than the outside diameter of the tube 13. The inner corners of the braze ring are chamfered as at 28, the largest diameter of the chamfer being initially somewhat larger than the outside diameter of the tube. The chamfers 28 are preferably about 30 degrees as measured from a longitudinal reference line.

Both inside corners of the split ring have the chamfer 28 so that it is immaterial which end of the ring faces toward the outside of the socket 12 when assembling the ring into the recess 18.

To make up the joint after the ring 25 has been inserted into the recess 18, the tube 13 is entered into the socket to the position shown in FIG. 2. In this position the outer corner 30 of the tube will enter the chamfer 28. Pushing on the tube will then cause the ring 25 to be spread in diameter until the tube 13 can slip therethrough and to the position shown in FIG. 3 with the outer corner 30 lightly wedged against the tapered portion 14 of the socket. Because of the spreading of the split ring 25, the latter will tend to return to its original size and thus grip the tube 13 tightly enough so that the coupling 10 will maintain its position upon the tube even though the tube should then be directed downwardly. This is very convenient during the process of installing the piping system since the coupling will not fall off but will maintain its position on the tube against the action of gravity when fitting and stringing the tubing in the installation. The wedge action of the tubing corner 30 against the taper 14 also assists in holding the fitting in place, particularly during the actual brazing operation when the ring 25 is molten.

The taper 14 has a further advantage in that it helps to center the tube 13 within the socket so that the clearance 22 between the tube and socket will be substantially uniform about the tube. Also, the taper 14, being slight, will permit the free end of the tube 13 to move in slightly without excessive strain on the brazed connection if the tube should become hot and expand after the joint has been made up.

In making up the joint, a greater amount of heat is applied to the outer end of the boss 11 than to the inner end so that the braze metal 25 will flow toward the chamfer 20 and build up a bead 31 at the outer end of the socket. Some of the braze metal will enter the clearance 22 between the recess 18 and the corner of the tube 30 but preferably does not reach the corner 30. In other words, the tube has a portion 33 adjacent its end which is free of any brazed or welded connection to the coupling body. Such free end 33 is radially deformable by wedge action against the tapered portion 14, as shown in FIG. 1, to a degree sufficient to permit slight endwise expansion of the free portion when either the tube or coupling or both are subjected to heat in an installation. This endwise expansion of the tube end is accommodated without imposing excessive strain on the brazed connection between the tube and coupling body which might otherwise crack the brazed connection and cause a leak.

I claim:
1. A coupling for tubes comprising a body member having a cylindrical bore for receiving a tube, an annular recess in said bore spaced inwardly from the outer end thereof, a ring of fusible metal located within the recess, said ring having an inside diameter initially smaller than the diameter of a tube to be inserted therethrough, said recess having a flat bottom wall of uniform diameter and having straight side walls that taper away from each other whereby the recess is wider at its smaller diameter than at its bottom, said ring being axially split and having a flat cylindrical outer surface and straight end walls each terminating in a chamfer, said ring also having a cross section of a thickness less than the depth of the recess and of a width less than the width of the recess whereby upon insertion of the tube through the ring the latter may expand readily within the recess without interference from the side or bottom walls thereof, said ring being responsive to heat for fusing to said tube and to said body member for forming a sealed joint therebetween.

2. A coupling for tubes comprising a body member having a cylindrical bore for receiving the tube, an annular recess in said bore spaced inwardly from the outer end thereof and defined by axially spaced straight side walls and a straight bottom wall, an axially split and expansible ring of fusible metal located within the recess, said ring having straight side and outer walls and having a cross section width less than the spacing of said side walls so as to permit expansion of the ring in said recess without interference from said side walls, the outside diameter of the ring being less than the diameter of the recess bottom wall and the inside diameter of said ring being substantially equal to the diameter of said cylindrical bore, the cross section thickness of said ring being less than the depth of said recess whereby said ring may drop to a position in said groove partially blocking said bore and be moved by said tube to a position so that said ring maintains a clearance with said bottom wall upon being expanded into said recess to a diameter large enough to receive the tube therethrough so that upon insertion of a tube through said ring the outer wall of the latter remains out of contact with said recess bottom wall whereby wedging of the ring between said tube and bottom wall is avoided, means operative between said ring and said tube to facilitate entry of the tube into the ring, said ring being responsive to heat for fusing to said tube and to said body member for forming a sealed joint therebetween.

References Cited by the Examiner

UNITED STATES PATENTS

| 1,890,998 | 12/32 | Lindquist | 285—287 |
| 1,901,820 | 3/33 | Parker | 285—287 |
| 1,931,666 | 10/33 | Lindquist | 285—287 |
| 1,964,474 | 6/34 | Lindquist | 285—287 |
| 2,050,728 | 8/36 | Ost | 285—287 |
| 2,166,078 | 7/39 | Stephenson | 285—287 |
| 2,646,995 | 7/53 | Thompson | 285—287 X |

FOREIGN PATENTS

| 605,006 | 7/48 | Great Britain. |

CARL W. TOMLIN, *Primary Examiner.*